United States Patent [19]

Williams

[11] Patent Number: 5,286,070
[45] Date of Patent: Feb. 15, 1994

[54] SADDLE TEE CONNECTOR ASSEMBLY

[76] Inventor: Richard T. Williams, P.O. Box 39, Uwchland, Chester County, Pa. 19480

[21] Appl. No.: 804,907

[22] Filed: Dec. 6, 1991

[51] Int. Cl.⁵ .......................... F16K 41/04; F16L 41/06
[52] U.S. Cl. ........................................ 285/197; 137/318
[58] Field of Search ............... 137/317, 318, 319; 285/197

[56] References Cited

U.S. PATENT DOCUMENTS

| | | | |
|---|---|---|---|
| 566,855 | 9/1896 | Friede | 285/197 |
| 3,038,490 | 6/1962 | Yocum | 285/197 |
| 3,162,211 | 12/1964 | Barusch | 285/197 |
| 3,198,206 | 8/1965 | O'Brien | 137/318 |
| 3,252,474 | 5/1966 | Ehrens et al. | 285/197 |
| 3,554,217 | 1/1971 | Ehrens | 137/318 |
| 3,737,180 | 6/1973 | Hayes, Jr. et al. | 285/197 |
| 3,817,270 | 6/1974 | Ehrens | 137/318 |
| 4,018,246 | 4/1977 | Langstroth | 137/318 |
| 4,240,459 | 12/1980 | Trautwein | 137/318 |
| 4,776,362 | 10/1988 | Domingue, Sr. et al. | 137/318 |

FOREIGN PATENT DOCUMENTS 1432635  2/1966  France .............................. 285/197

*Primary Examiner*—Eric K. Nicholson
*Attorney, Agent, or Firm*—John F. A. Earley; John F. A. Earley, III

[57] ABSTRACT

A saddle tee connector assembly for making a tee connection to a copper tube comprises a saddle tee connector with a bottom clamping portion, a top clamping portion with an outwardly extending boss which has a bore, an annular chamber in the bottom of the bore, a cutting pin positioned in the bore, and a drive nut which is rotated to move the cutting pin downwardly in the bore to cut a hole in the tube and is rotated in the opposite direction to retract the cutting pin from the hole in the tube. The drive nut and pin are removed to permit the attachment of a tube to the boss to form a tee connection. A method is provided for using the saddle tee connector assembly to make a tee connection to a tube.

5 Claims, 5 Drawing Sheets

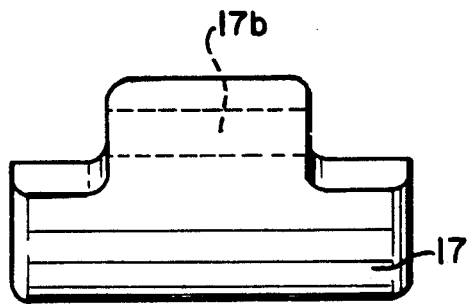
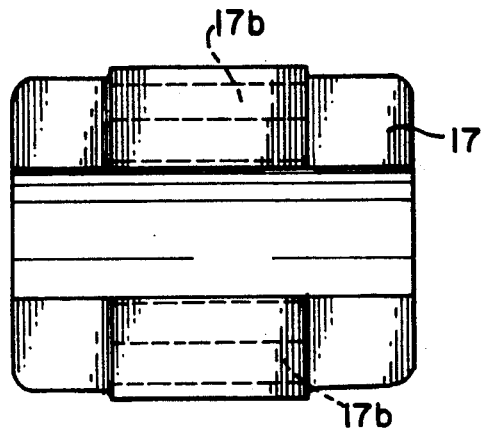
FIG. 11  FIG. 12
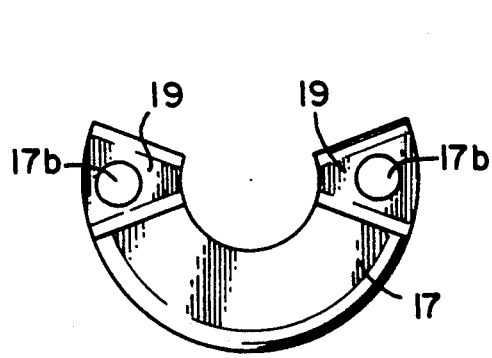
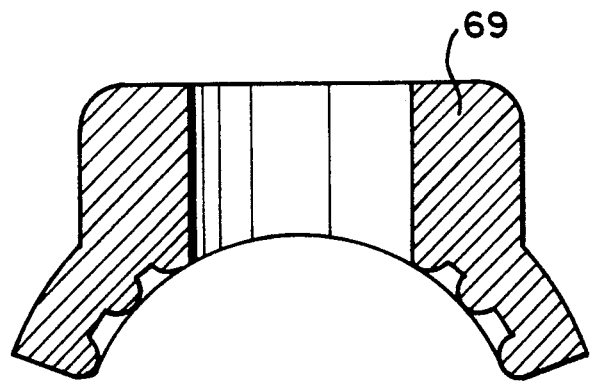
FIG. 13  FIG. 14

SADDLE TEE CONNECTOR ASSEMBLY

BACKGROUND OF THE INVENTION

1. Field of the Invention

The present invention relates to making a tee connection to a copper tube without cutting out a portion of the tube to form two cut ends which are spaced-apart, inserting a tee connector between the two cut ends, and soldering the tee connector to the two cut ends. The present invention contemplates using a saddle tee connector assembly that clamps a saddle tee connector around a tube, cuts a hole into the side wall of the tube by piercing it with a cutting pin, and then withdraws the cutting pin and its drive mechanism from the saddle tee.

2. Description of the Prior Art

It is conventional in the prior art, when it is desired to make a tee connection to a copper tube, to cut out a portion of the copper tube, insert a tee connector in the space between the two cut ends of the copper tube, and then solder the tee connector to the two cut ends of the tube.

This procedure has a number of disadvantages. Cutting out a portion of the copper tube and replacing it with a tee connector by soldering is time consuming, and the tee connector may leak if the soldering is not done properly. The old procedure also requires more equipment, like a saw, and soldering apparatus, and some skill in its use.

It is also conventional in the plumbing industry to use saddle tee connectors, and there are perhaps a dozen different designs available. However, few if any of them are easy to install and are reliable, and few offer relatively high flow rates, i.e., relatively low pressure loss. Many are made of metals that corrode easily. Some require drilling with an electrical or other hand drill. In other words, there are many self-tapping and/or saddle tee connectors, but none that provide all the advantages that most drinking water systems manufacturers are seeking.

SUMMARY OF THE INVENTION

To overcome the problems involved in sawing out a piece of a copper tube and inserting a tee connector, and soldering the tee connector to the tube, the present invention provides saddle tee connector assembly apparatus which does not require the use of a saw or soldering apparatus. Instead, the present invention provides a self-contained saddle tee connector assembly which requires only the use of a wrench or a pair of pliers to rotate a drive nut that moves a cutting pin to pierce a hole in the side wall of the tube. The drive nut is then rotated in the opposite direction to retract the cutting pin from the hole in the tube and then the drive nut and the cutting pin are removed from the saddle tee connector, leaving the saddle tee connector in place with a sealing member surrounding the hole made in the tube, with the newly formed hole being in communication with the bore of the saddle tee connector which may then be connected to another tube.

The saddle tee connector of the present invention provides a unique design with the following advantages:

1. Quick and easy installation.
2. Superior reliability.
3. Non-corrosive materials of construction.
4. Greatly superior flow characteristics.
5. Lower cost.
6. The best combination of all of the above.

BRIEF DESCRIPTION OF THE DRAWINGS

FIG. 11 is a view in side elevation of the bottom clamping portion of the saddle tee connector;

FIG. 12 is a view in top plan of the bottom clamping portion of FIG. 11;

FIG. 13 is a view in side elevation of the bottom clamping portion of FIG. 11;

FIG. 14 is a view in vertical section of the seal member of the saddle tee connector.

DETAILED DESCRIPTION OF THE DRAWINGS

Figure 1:
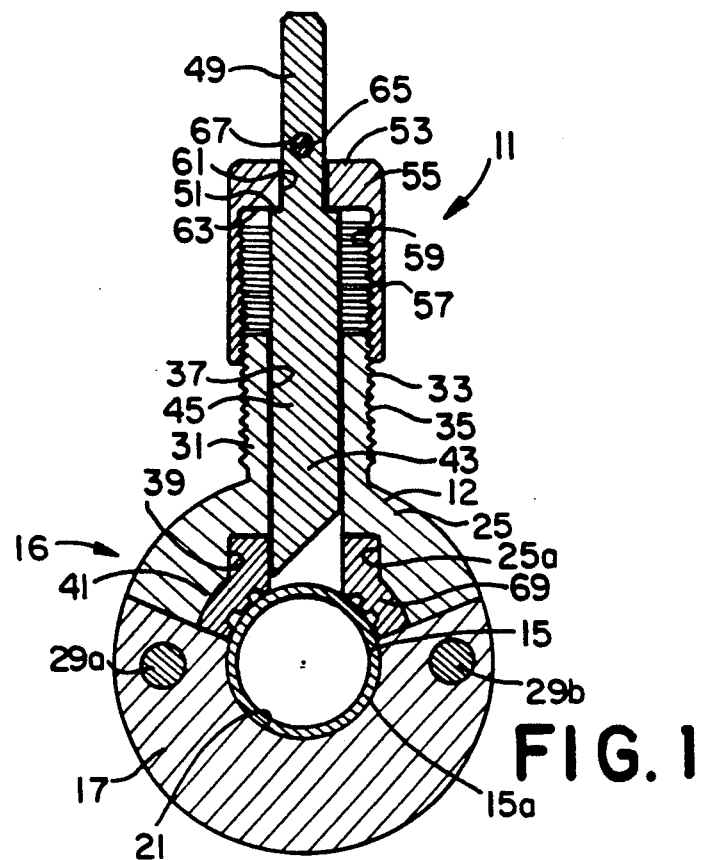
FIG. 1 is a view in vertical section of the saddle tee connector assembly constructed in accordance with the invention and mounted on a tube in start position before cutting a hole in the tube to make a tube connection.
Figure 2:
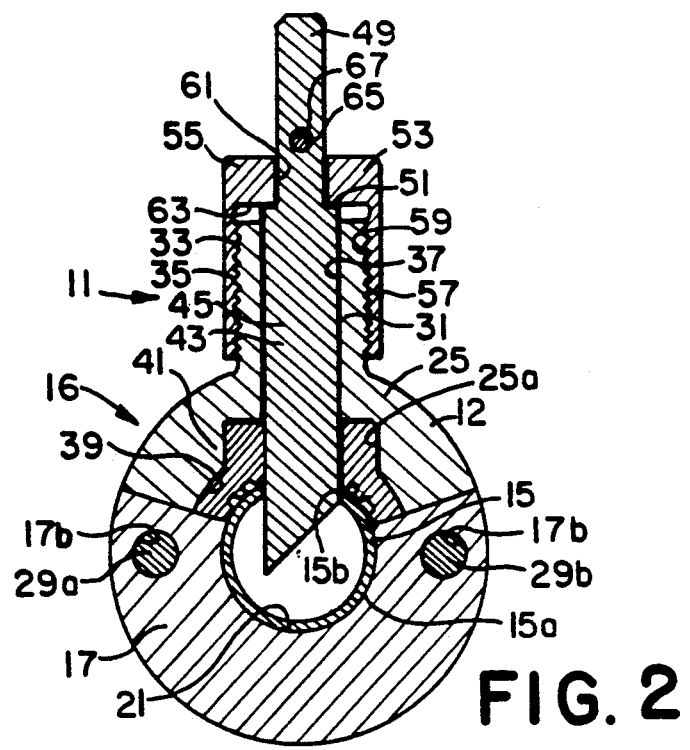
FIG. 2 is a view similar to FIG. 1 and shows the saddle tee connector assembly after it has cut a hole in the tube.

Turning now the drawings, there is shown a saddle tee connector assembly 11 for making a tee connection to a copper tube 15 having an outer surface 15a. The connector assembly 11 has a saddle tee connector 12 which comprises a bottom portion 17 having a U-shape with an inner surface 21 adapted to abut against the outer surface 15a of the tube 15. Bottom clamping portion 17 is provided with end faces 19 (FIG. 13).

Figure 3:
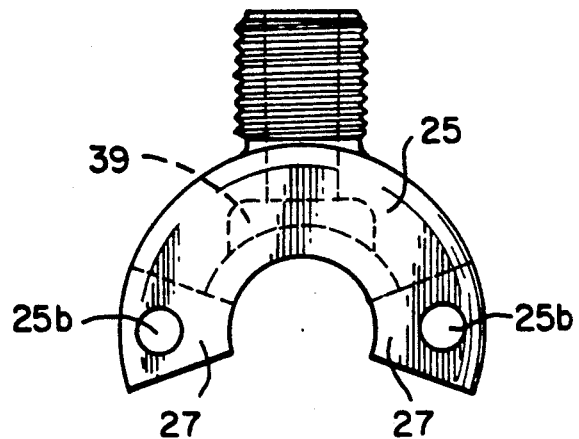
FIG. 3 is a view in front elevation of a top clamping portion of the saddle tee connector of the invention.
Figure 4:
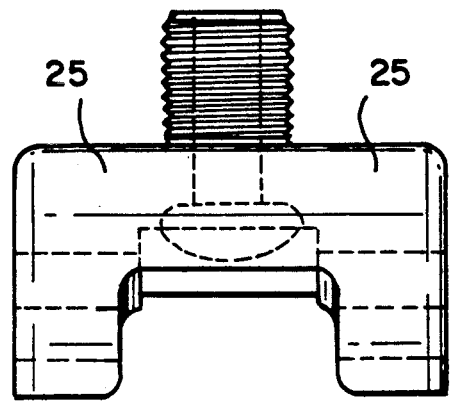
FIG. 4 is a view in side elevation of the top clamping portion of FIG. 3.
Figure 3A:
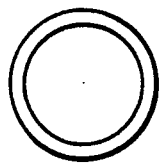
FIG. 3a is a view in section of the tube.
Figure 5:
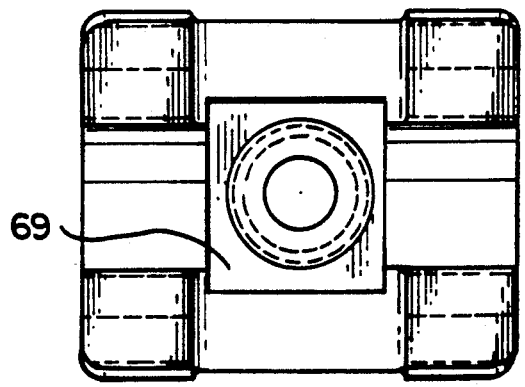
FIG. 5 is a view in bottom plan of the top clamping portion of FIG. 4.
Figure 6:
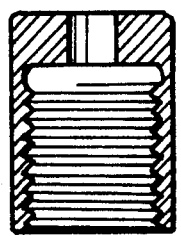
FIG. 6 is a view in vertical section of a drive nut which forms an element of the saddle tee connector assembly of the invention.
Figure 7:
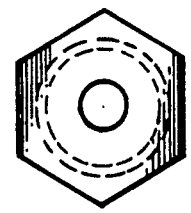
FIG. 7 is a view in top plan of the drive nut of FIG. 6.
Figure 8:
FIG. 8 is a view in front elevation of the cutting pin which forms an element of the saddle tee connector assembly.
Figure 8A:
FIG. 8a is a view in side elevation of the cutting pin of FIG. 8.
Figure 9:
FIG. 9 is a top plan view of the cutting pin of FIG. 8.
Figure 10:
FIG. 10 is a view of a steel stop pin which forms an element of the cutting pin.
Figure 15:
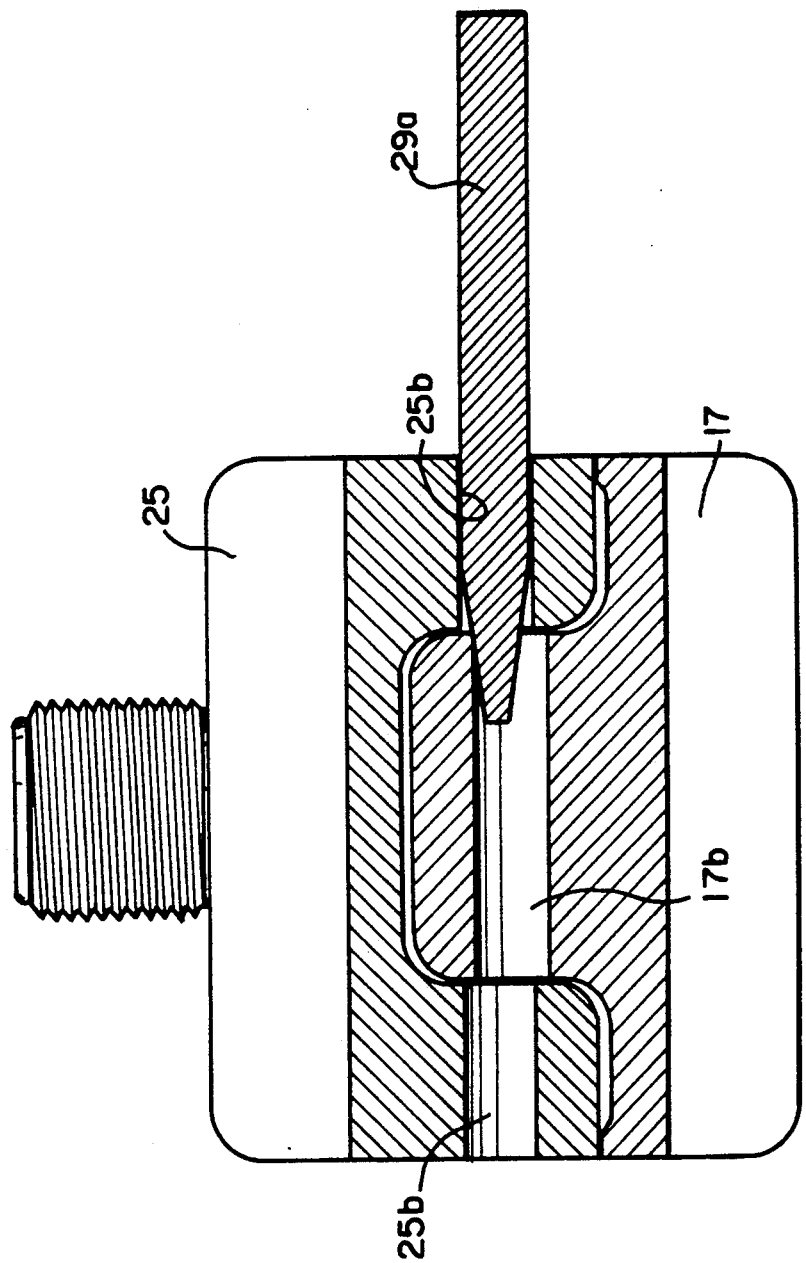
FIG. 15 is a side elevational view in partial section of the top clamping portion of FIG. 4 in the process of being clamped to the bottom clamping portion of FIG. 13 by a pin having a tapered end.

A top clamping portion 25 is provided which has U-shape with an inner surface 25a, and has end faces 27 (FIG. 3) that mate with the end faces 19 of the bottom clamping portion 17.

Two fasteners or holding pins 29a, 29b pass through holes 17b in bottom portion 17 and holes 25b in top portion 25 and hold together the top end faces 27, 19 of the top and bottom clamping portions 25, 17. The ends of the pins 29a, 29b are tapered to provide compression of the seal 69 when in position, because pins 29a, 29b cam holes 17b and 25b into alignment and cause top clamping portion 25 to squeeze down on rubber seal 69 to compress the seal 69.

The top clamping portion 25 includes an outwardly extending boss 31, and the boss 31 is provided with exterior threads 33 on its outer surface 35. A cylindrical bore 37 extends through the boss 31 and the entire top clamping portion 25.

An annular chamber 39 is provided in the bottom inner portion 41 of the top clamping portion 25 around the cylindrical bore 37.

A steel cutting pin 43 having a cylindrical body is provided and has a main body portion 45 and a reduced diameter body portion 49 which form a drive shoulder 51 at the top of the main body portion 45 of the cutting pin 43.

A cup-shaped multi-sided drive nut 53 is provided which has a base 55 from which depends an annular side wall 57 that has interior threads 59 which engage the exterior threads 33 of the boss 31.

Drive nut 55 has a central opening 61 at its base 55 through which its upper body portion 49 of the cutting pin 43 projects so that the drive shoulder 51 of the cutting pin 4 is contacted by the bottom surface 63 of the base 55 to force the cutting pin 43 downwardly into the tube 15 when the drive nut 53 is rotated.

A transverse hole 65 is formed in the upper body portion 49 of the cutting pin 43 and is positioned above the top of base 55 of the drive nut 53 when shoulder 51 is contacted by bottom surface 63 of the base 55.

A steel stop pin 67 is positioned in the transverse hole 65 with the stop pin 67 extending outwardly from both ends of the hole 65 so that when the drive nut 53 is rotated to move it upwardly on the threaded boss 31, the base 55 of the drive nut 53 contacts the stop pin 67 and moves the cutting pin 43 upwardly to retract the cutting pin 43 from the tube 15.

A rubber seal member 69 is seated in the chamber 39 of inner portion 41 of top clamping portion 25 and is pressed against and contacts the outer surface 15a of the tube 15 to seal the contents of the tube 15 from escaping from the hole 15b made in the tube 15.

Rubber seal member or gasket 69 is rather soft and is bonded into chamber 39 by an adhesive. Rubber seal member 69 protrudes from chamber 39. When bottom portion 17 and top portion 25 are clamped together by the pins 29a and 29b, the pins 29a and 29b force the gasket 69 into a compressed condition around the tube 15 being pierced, thereby sealing the opening 15b in the tube made by the cutting pin 43.

In operation, the method of making a tee connection to a tube 15 having an outside surface 15a without cutting a portion of the tube 15 to form two cut ends which are spaced-apart, and without inserting a tee connector between the two cut ends and soldering the connector to the two cut ends, comprises the steps of placing the bottom U-shaped clamping portion 17 of a saddle tee connector 25 against the outside surface 15a of the tube 15, placing the top U-shaped clamping portion 25 of the saddle tee connector 12 against the outside surface 15a of the tube 15, and clamping the bottom and top clamping portions 17, 25 together around the tube 15 by inserting pins 29a, 29b through holes 17b, 25b with the taper of pins 29a, 29b camming holes 17b, 25b into alignment. The top clamping portion 25 has a hollow boss 31 with a cylindrical bore 37. Cutting pin 43 is driven through the bore 37 of the boss 31, cutting a hole 15b in the tube 15. The outside surface of the tube 15 around the hole 15b is sealed by seal member 69. The pin 43 is withdrawn from the hole and from the boss 31, and another tube is attached to the boss 31 to form a tee connection.

In more detail, the operation of making a tee connection comprises providing the saddle tee connector assembly 11. The assembly 11 has saddle tee connector 12 including bottom clamping portion 17 with a U-shape and an inner surface 21 adapted to abut against the outer surface 15a of the tube 15, and end faces 19. Connector 12 also includes top clamping portion 25 having a U-shape with an inner surface 25a, and end faces 27 that mate with the end faces 19 of the bottom portion 17. Two holding pins 29a, 29b are inserted into holes 17b, 25b to hold the end faces 27, 19 together. Boss 31 extends outwardly from the top clamping portion 25. The boss 31 has exterior threads 33 on its outer surface 35 and a cylindrical bore 37 which extends through the entire top clamping portion 25. Annular chamber 39 is formed in the bottom inner portion 41 of the top clamping portion 25 around the cylindrical bore 37. Cutting pin 43 is positioned in bore 37 and has a cylindrical body with a main body portion 45 and a reduced diameter upper body portion 49 providing a drive shoulder 51 at the top of the main body portion 45. Cup-shaped multi-sided drive nut 53 has a base 55 from which depends an annular side wall 57, and side wall 57 has interior threads 59 which engage the exterior threads 33 of boss 31. The drive nut 53 has a central opening 61 in its base 55 through which the upper body portion 49 of the cutting pin 43 projects so that when the drive nut 53 is rotated to move downwardly on boss 31, the drive shoulder 51 of the cutting pin 43 is contacted by the bottom surface 63 of the base 55 to force the cutting pin 43 downwardly into the tube 15 to pierce a hole 15b in the tube. The transverse hole 65 formed in the upper body 49 of the cutting pin 43 is positioned above the top of the base 55 of the drive nut 53 when shoulder 51 is contacted by bottom surface 63 of base 55. The stop pin 67 is positioned in the transverse hole 65 and extends outwardly from both ends of the hole 65 so that when the drive nut 53 is rotated to move upwardly on the threaded boss 31, the base 55 of the drive nut 53 contacts the stop pin 67 and moves the cutting pin 43 upwardly to retract the cutting pin 43 from the hole 15b in the tube 15. The rubber tube seal member 69 seated in chamber 39 of the top portion 25 contacts the outer surface 23 of the tube 15 to seal the contents of the tube 15 from escaping from hole 15b.

To form the tee connection, the bottom U-shaped clamping portion 17 is placed against the outside surface 15a of the tube 15, and the top U-shaped clamping portion 25 is placed against the outside surface 15a of the tube 15. The bottom and top clamping portions 17, 25 are clamped together around the tube 15, by inserting holding pins 29a, 29b into the holes 17b, 25b and clamping the end faces 19, 27 together. Cutting pin 43 is driven through the bore 37 of the boss 31, and cuts a hole 15b in the tube 15. The outside surface of the tube 15 is sealed around the hole 15b in the tube 15 by squeezing the rubber tube seal member 69 against the outer surface 15a of the tube 15. The pin 43 is then withdrawn from the hole 15b and from the boss 31 by rotating drive nut 53 to move upwardly and cause base 55 to push upwardly against stop pin 67.

I claim:
1. A saddle tee connector assembly (11) for making a tee connection to a copper tube (15) having an outer surface (15a), comprising
a saddle tee connector (12), a bottom clamping portion (17) having a U-shape in an axial direction of the tube (15) with an inner surface (21) adapted to abut against the outer surface (15a) of the tube (15), a top clamping portion (25) having an upside-down U-shape in said axial direction with an inner surface (25a), fasteners holding the top and bottom clamping portions (25), (27) together, a cutting pin (43) for cutting a hole in the tube (15), the cutting pin having a cylindrical body with a main body portion (45) and a reduced diameter upper body portion (49) providing a drive shoulder (51) at the top of the main body portion (45), a single means for both guiding the cutting pin (43) and subsequently directing fluid flow completely through itself, comprising
  (i) an outwardly extending boss (31) formed in the top clamping portion (25),
  (ii) said boss (31) having an upper end portion and a lower end portion and an outer surface (35), exterior threads (33) formed on the outer surface (35), a cylindrical bore (37) extending through the entire top clamping portion (25) and through the boss (31) between the upper end portion and the lower end portion, wherein the bore (37) both guides the cutting pin (43) therethrough, and subsequently directs fluid flow from the cut tube (15) and completely through the bore (37) up to the upper end portion of the boss (31) after the cutting pin (42) has been removed from the bore (37), an annular chamber (39) in the bottom inner portion (41) of said top clamping portion (25) at the bottom of the cylindrical bore (37), a cup-shaped multi-sided drive nut (53) having a base (55) from which depends an annular side wall (57), side wall (57) having interior threads (59) which engage the exterior threads (33) of boss (31), said drive nut having a central opening (61) in its base (55) through which the upper body portion (49) of the cutting pin (43) projects so that the drive shoulder (51) of the cutting pin (43) is contacted by the bottom surface (63) of the base (55) to force the cutting pin (43) downwardly into the tube (15) when the drive nut is rotated to move downwardly on boss (31), a transverse hole (65) formed in the upper body (49) of the cutting pin (43), the transverse hole (65) being positioned above the top of the base (55) of the drive nut (53) when shoulder (51) is contacted by bottom surface (63) of base (55), a stop pin means (67) for completely retracting cutting pin (43) from the tube (15) and the cylindrical bore (37) of said boss (31), said stop pin means being positioned in said transverse hole (65) with said stop pin means (67) extending outwardly from both ends of the hole (65) so that when the drive nut (53) is rotated to move upwardly on the threaded boss (31), the base (55) of the drive nut (53) contacts said stop pin means (67) and moves the cutting pin (43) upwardly to completely retract the cutting pin (43) from the tube (15) and the cylindrical bore (37) of said boss (31), and a rubber tube seal member (69) seated in the inner portion (41) of the top portion (25) of the saddle tee connector (12) and contacting the outer surface (15a) of the tube (15) to seal the hole (15b) of the tube (15).

2. The saddle tee connector assembly of claim 1,
said bottom clamping portion (17) having end faces (19),
said top clamping portion (25) having end faces (27) that mate with the end faces (19) of the bottom clamping portion (17),
and said fasteners including two holding pins (29a, 29b) which have tapered end portions and hold the end faces (27), (19) of the top and bottom clamping portions (25), (17) together.

3. A method of making a tee connection to a tube having an outside surface comprising
placing a bottom U-shaped clamping portion of a saddle tee connector against the outside surface of a tube,
placing a top U-shaped clamping portion of a saddle tee connector against the outside surface of the tube,
clamping said bottom and top clamping portions together around the tube,
said top clamping portion having a hollow boss extending outwardly with the boss having a cylindrical bore,
driving a solid cutting pin through the bore of the boss,
cutting a hole in the tube with the pin,
sealing the outside surface of the tube around the hole,
and completely withdrawing the pin from the hole of the tube and from the boss.

4. A method of making a tee connection to a tube having an outside surface, comprising
providing a saddle tee connector assembly (11) for making a tee connection to a copper tube (15) having an outer surface (15a), said connector assembly (11) having
a saddle tee connector (12),
a bottom clamping portion (17) having a U-shape in an axial direction of the tube (15) with an inner surface (21) adapted to abut against the outer surface (15a) of the tube (15) and end faces (19),
a top clamping portion (25) having a U-shape in said axial direction with an inner surface (25a) and end faces (27) that mate with the end faces (19) of the bottom portion (17),
fasteners (29a), (29b) holding together the end faces (27), (19) of the top and bottom clamping portions (25), (17),
the top clamping portion (25) including an outwardly extending boss (31),
said boss (31) having exterior threads (39) on its outer surface (35) and a cylindrical bore (37) extending through the boss (31) and the entire top clamping portion (25),
an annular chamber (39) in the bottom inner portion (41) of said top clamping portion (25) at the bottom of the cylindrical bore (37),
a cutting pin (43) positioned in bore (37) and having a cylindrical body with a main body portion (45) and a reduced diameter upper body portion (49) providing a drive shoulder (51) at the top of the main body portion (45),
a cup-shaped multi-sided drive nut (53) having a base (55) from which depends an annular side wall (57),
side wall (57) having interior threads (59) which engage the exterior threads (33) of boss (31), said drive nut (53) having a central opening (61) in its base (55) through which the upper body portion (49) of the cutting pin (43) projects so that the drive shoulders (51) of the cutting pin (43) is contacted by the bottom surface (63) of the base (55) to force the cutting pin (43) downwardly into the tube (15) when the drive nut is rotated to move downwardly on boss (31), a transverse hole (65) formed in the upper body (49) of the cutting pin (43), the transverse hole (65) being positioned above the top of the base (55) of the drive nut (53) when shoulder (51) is contacted by bottom surface (63) of base (55), a stop pin (67) positioned in said transverse hole (65) with stop pin (67) extending outwardly from both ends of the hole (65) so that when the drive nut (53) is rotated to move upwardly on the threaded boss (31), the base (55) of the drive nut (53) contacts the stop pin (67) and moves the cutting pin (43) upwardly to retract the cutting pi (43) from the tube (15), and a rubber tube seal member (69) seated in the inner portion (41) of the top portion (25) of the saddle tee connector (12) and contacting the outer surface (15a) of the tube (15) to seal the contents of the tube (15) from escaping, placing the bottom U-shaped clamping portion (17) of the saddle tee connector (12) against the outside surface (15a) of the tube (15), placing the top U-shaped clamping portion (25) of the saddle tee connector (12) against the outside surface (15a) of the tube (15), clamping said bottom and top clamping portions (17), (25) together around the tube (15), driving cutting pin (43) through the bore (37) of the boss (31) by rotating said drive nut (53) to move downwardly on said boss (31), cutting a hole (15b) in the tube (15) with the cutting pin (43), sealing the outside surface of the tube (15) around the hole (15b) by squeezing the rubber tube seal member (69) against the outer surface (15a) of the tube (15), completely withdrawing the pin (43) from the hole (15b) of the tube (15) and from the bore (37) of the boss (31), by rotating said drive nut (53) against stop pin (67) to move upwardly on said boss (31).

5. The saddle tee connector assembly of claim 1, said top clamping portion (25) having two sides which each have an upside-down U-shape in a transverse direction which is perpendicular to said axial direction of the tube (15), so as to have a pair of arcuate end portions and a central arcuate recess disposed therebetween, each pair of end portions having through holes (25b) formed therein which are aligned with each other in said axial direction, said bottom clamping portion (17) having two sides which each have an upside-down T-shape in said transverse direction so as to have a central arcuate protuberance adapted to fit into the central arcuate recess of said top clamping portion (25), wherein when said top clamping portion (25) is interlocked with said bottom clamping portion (17), the tube (15) is completely encircled, each central protuberance having a through hole (17b) formed therein in said axial direction which is aligned with the through holes (25b) of each pair of said end portions when said top clamping portion (25) is interlocked with said bottom clamping portion (17) around the tube (15), said fasteners including two holding pins (29a, 29b) for holding said top clamping portion (25) and said bottom clamping portion (17) together, each of said holding pins (29a, 29b) having tapered end portions and being inserted through the through holes (25b) of the pair of end portions and the through hole (17b) of the central protuberance to bring said holes of the top and bottom clamping portions into alignment and to move the top and bottom clamping portions toward each other to clamp down on rubber seal (69).

* * * * *